United States Patent [19]

Spanswick

[11] 4,101,510

[45] Jul. 18, 1978

[54] FIRE RETARDANT POLYMER

[75] Inventor: James Spanswick, Wheaton, Ill.

[73] Assignee: Standard Oil Company a corporation of Indiana, Chicago, Ill.

[21] Appl. No.: 775,933

[22] Filed: Mar. 9, 1977

Related U.S. Application Data

[63] Continuation-in-part of Ser. No. 635,169, Nov. 25, 1975, abandoned.

[51] Int. Cl.² .................................................. C08K 3/38
[52] U.S. Cl. ........................ 260/45.75 B; 260/28.5 A; 260/28.5 B; 260/28.5 D; 260/45.7 RT; 260/45.7 R; 260/45.75 R; 260/45.75 F; 260/45.75 M; 260/45.75 P; 260/45.75 E; 260/45.75 G; 260/45.75 N; 260/881; 260/884; 260/897 C

[58] Field of Search ........... 260/884, 897 C, 45.7 RL, 260/45.75 B, 881, 45.7 R, 45.75 R, 45.75 F, 45.75 M, 45.75 P, 45.75 E, 45.75 G, 45.75 N, 28.5 A, 28.5 B, 28.5 D; 526/293

[56] References Cited

U.S. PATENT DOCUMENTS

| 3,311,602 | 3/1967 | Raley | 260/93.5 |
|---|---|---|---|
| 3,442,980 | 5/1969 | Grabowski | 260/45.8 A |
| 3,953,540 | 4/1976 | Takezoe et al. | 260/884 |
| 3,959,398 | 5/1976 | Jalics | 526/293 |

*Primary Examiner*—V. P. Hoke
*Attorney, Agent, or Firm*—Ronald C. Petri; Arthur G. Gilkes; William T. McClain

[57] ABSTRACT

A fire retardant polymer which has a low halogen content is obtained by incorporating a vinyl aromatic containing a group reactive under Friedel-Crafts conditions and a Lewis acid or Lewis acid precursor within a thermoplastic composition.

14 Claims, No Drawings

FIRE RETARDANT POLYMER

CROSS-REFERENCE TO RELATED CASE

This application is a continuation-in-part of U.S. patent application Ser. No. 635,169, filed Nov. 25, 1975, now abandoned.

BACKGROUND OF THE INVENTION

This invention relates to fire retardant polymers and more specifically to such polymers having a low halogen content.

There is an immediate need for fire retardant thermoplastic resins, especially fire retardant styrene polymers having a relatively low halogen content and producing a low halogen smoke. This type of styrene polymer is required especially for use in fabricating furniture and television cabinets. Although many halogen-containing additives have been employed in thermoplastic polymers to yield some degree of fire retardance, most employ substantial amounts of halogen.

Two modes of fire retardance mechanisms are known, namely, halogen/antimony-type gas-phase flame inhibition and formation of a pyrolysis char that inhibits flame propagation. In the latter method certain bifunctional cross-linking agents such as 4,4'-bis(chloromethyl)diphenyl oxide have been used as additives to promote char. In the former process, the halide combines in the gas phase with the free radicals produced during combustion. Thus, free radicals are prevented from propagating the burning reaction and combustion stops.

As noted by Lyons, "Chemistry and Uses of Fire Retardance," Interscience Publishers, 1970, a strictly halogen mechanism typically requires at least 12 to 15% chlorine before flame retardance is observed. The same source reports that at least 7% chlorine is necessary in the presence of $Sb_2O_3$ for flame retardance. In addition, the work of Fenimore, et al., "Combustion and Flame," Vol. 10, 1966, serves to place a lower limit on the halogen content necessary in the art recognized halogen/antimony mechanism. Fenimore et al. examined known ways of making polymers less flammable. It was found that a chlorinated polyethylene composition with greater than 7% chlorine did possess flame retardant characteristics in the presence of $Sb_2O_3$. A composition containing 2.4% chlorine, however, was found to have too little chlorine to develop the inhibitory action of antimony fully. Thus, this mechanism would require a minimum of 7% halogen, and possess the attendant disadvantage of producing high halogen content smoke.

It is desirable, therefore, to develop polymers requiring less halogen to develop flame retardant characteristics. Indeed, a halogen independent mechanism is needed to completely eliminate the harmful effects of halogen containing smoke. I have found such a halogen independent mechanism. Even when vinylbenzylchloride is employed in my invention, the halogen levels are significantly lower than in the prior art.

SUMMARY OF THE INVENTION

My invention is a flame retardant thermoplastic composition comprising a thermoplastic resin; an effective amount of a vinyl aromatic comonomer containing a group reactive under Friedel-Crafts conditions incorporated within the resin; and an effective amount of a Lewis acid or Lewis acid precursor, which forms a char that inhibits flame propagation.

DESCRIPTION OF THE INVENTION

I have found that if a vinyl aromatic monomer containing a group reactive under Friedel-Crafts conditions such as vinylbenzylchloride (VBC) is incorporated within a thermoplastic resin composition in the presence of a Lewis acid or a Lewis acid precursor, then, under flame conditions, a "tight" cross-link is formed among the polymer chains which promotes char formation. My invention involves solid phase substitution reactions taking place when pyrolysis occurs. The substituted polystyrene then undergoes a cross-linking reaction, forming a char which coats the surface of the material at the flame front and effectively reduces the fuel available to the flame. As the vinyl aromatic monomer used in the process can be vinylbenzylchloride and the Lewis acid or Lewis acid precursor used as catalyst in the process can be $Sb_2O_3$, then the fortuitous result obtains that when these specific components are used, the well-known halide/$Sb_2O_3$ gas phase flame inhibition mechanism may also be present as a supplement to the primary cross-linking/char-formation mechanism of my invention.

The comonomers useful in this invention are those which contain a group which can link to an aromatic ring under Friedel-Crafts conditions. Such comonomers include vinyl aromatics with the structure:

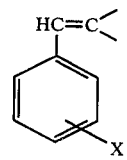

where X is $-CH_2Cl$, $-CH_2Br$, $-CH_2OH$, $-SO_3H$, $-C-O-R$, $-CHO$, $-CO_2R$, $-CH(CH_3)_2$ or $-C(O)CH_3$ and R is an alkyl radical containing 1 to 6 carbon atoms. The preferable comonomer is vinylbenzylchloride. Friedel-Crafts reactions are discussed more fully by G. Olah in "Friedel-Crafts and Related Reactions," Interscience Publishers, 1964, incorporated herein by reference. The specific Friedel-Crafts conditions which are operative in my invention are those in which an aromatic moiety and a reactive group are reacted in the presence of a Lewis acid or Lewis acid precursor.

In my system, a flame retardant effective amount from about 5 to 20% and preferably about 10 to 15% of a comonomer of this invention is contained within the thermoplastic resin composition. Where the comonomer employed is VBC, these concentrations correspond to 1.2 to 4.8% and preferably 2.4 to 3.6% chlorine in the polymer. It is known in the art that chlorine levels less than 5% are not inherently flame retardant, even in the presence of $Sb_2O_3$. As my invention employs less than 5% chlorine in the resin composition, the independence from the prior art halide/$Sb_2O_3$ mechanism is apparent.

Generally, the more of the reactive monomer of this invention incorporated in a polymer, the more flame resistant that polymer becomes. Using VBC as the preferred example, the minimum amount of VBC is limited by its effectiveness as a flame retardant promoter. The maximum amount of VBC is limited by the tendency of polymeric compositions incorporating VBC to cross-link prematurely, e.g., in an extruder, to form a non-fusible material. In the most preferable case, VBC can be copolymerized with styrene to form a styrene-VBC copolymer. Alternatively, a copolymer containing VBC can be blended with additional thermoplastic polymer to form a blend containing a suitable amount of VBC. Less preferably, vinylbenzylchloride homopolymer can be blended with a thermoplastic polymer. Such blended compositions possess fire retardance, since the VBC can cross-link the polymer chains. In addition, it is preferable that the polymer exhibits a low degree of substitution so that the material can be extruded in the presence of a cross-linking catalyst and still remain thermoplastic.

By thermoplastic resin, I mean polymers of styrene, substantially crystalline polymers of propylene, high density polyethylene and copolymers thereof. The styrene polymer in which the flame retardant system of my invention can be incorporated can be either a styrene homopolymer, copolymers including styrene-acrylonitrile and acrylonitrile-butadiene-styrene copolymers or the rubber-modified "impact" polymers. The polymeric products can be formed by the usual styrene polymerization techniques such as mass thermal, mass suspension or solution, although mass thermal is preferred. Other materials can be present in the polymerization of styrene polymers incorporating any flame retardant system, such as stabilizers, antioxidants, colorants and lubricants. In rubber-modified styrene polymer about 2 to 20% and typically about 3 to 10% of a polybutadiene or styrene-butadiene rubber grafted with polystyrene is incorporated within a styrene polymer matrix.

In conjunction with VBC, an effective amount from about 2 to 20 wt.% and preferably about 5 to 15 wt.% of a Lewis acid or a Lewis acid precursor is incorporated into my system. Preferred additives which are blended into the polymeric compositions, are antimony oxide, antimony oxide-chlorinated paraffin (e.g., Chlorowax 70) mixture, stannous chloride and ferric chloride. A particularly advantageous additive is stannous chloride which, when blended with a styrene-VBC copolymer, is clear and water white.

My invention is demonstrated but not limited by the following illustrations. Examples of my invention are denoted by letter designations while comparative data is denoted by numerals.

ILLUSTRATION I

An 87/13 weight percent copolymer of styrene-vinylbenzylchloride (Copolymer I) was prepared by vial polymerization. Into each of a series of 17 × 125mm. flasks was added 10g. of styrene monomer and 1.5g. vinylbenzylchloride monomer, and the flasks sealed under vacuum after freezing the monomer mixture. The copolymer was prepared by heating the vials to 130° C for 10 hours, then to 150° C for a further 16 hours. The resulting clear copolymer was ground on a Wiley mill and dry blended with 10 weight percent of either antimony oxide, stannous chloride or zinc oxide. To similar blends 10 weight percent of Chlorowax 70 was added. The blends were compression molded into bars ⅛ × ½ × 5 inch and tested in UL-94 configuration. The burning characteristics are described in Table I.

Table I

| Run | Polymer | Additives | Burning Test |
|---|---|---|---|
| 1 | Polystyrene | None | Burns, drips. |
| A | Copolymer I | None | Burns, no drips. |
| 2 | Polystyrene | $Sb_2O_3$ (10%) | Burns, drips. |
| B | Copolymer I | $Sb_2O_3$ (10%) | Burns, forms a char, then goes out. |
| 3 | Polystyrene | $Sb_2O_3$ (10%) Chlorowax 70 (10%) | Burns, drips. |
| C | Copolymer I | $Sb_2O_3$ (10%) Chlorowax 70 (10%) | No flame 1st ignition or 2nd ignition. Forms good char. |
| 4 | Polystyrene | $Sb_2O_3$ (10%) Chlorowax 70 (20%) | Burns, drips. |
| D | Copolymer I | $SnCl_2$ (10%) (Clear) | No burns 1st or 2nd ignition. Prolonged flame yields good char. |
| E | Copolymer I | $SnCl_2$ (10%) Chlorowax (10%) | Burns for 20 seconds, forms char, then goes out. |
| F | Copolymer I | ZnO (10%) | No burn 1st ignition, prolonged flame yields dense char. |
| G | Copolymer I | ZnO (10%) Chlorowax 70 (10%) | Burns 20 seconds, then forms char and goes out. |

Several comparisons can be drawn from the above table that point up the utility of the system developed and its mechanism. A comparison of runs (1) and (A) show that even in the uncatalyzed state the presence of a pendant chloromethyl group reduces the tendency of polystyrene to drip. The material continues to burn, however, showing that the small amount of halogen (approximately 3%) does not affect its overall flammability. The addition of 10% $Sb_2O_3$ has little effect on the burning of polystyrene but gives flame retardance to the copolymer [compare (2) and (B)]. A comparison of (B) and (3) shows that this flame retardancy is not due to the known antimony/halogen system since blend (3) contains more halogen than blend (B), but still burns. When additional halogen is added to the copolymer, [compare blends (B), (3), and (C)] the dual effect of char formation and perhaps a supplementary antimony/halogen flame inhibition is seen. A comparison of (C) and (4) shows once more that the enhancement of fire retardancy is not due to antimony/halogen since (4) contains more halogen but still fails the test. The role of the halogen in the blend is primarily to convert $Sb_2O_3$ to $SbCl_3$ in the solid phase, and the substituted antimony halide catalyzes the Friedel-Crafts reaction that causes the formation of a cross-linked structure that forms the basis of the char. The char structure is not solely cross-linked aromatic rings, but metal salts are also entrapped, thus aiding in the shielding of the substrate from the flame.

Further examination of Table I shows that the mechanism of fire retardancy must be by some route other than by antimony/halogen. A comparison of blends (B), (D), and (F) show that the copolymer forms an efficient fire retardant char with various metal salts. Since blends (D) and (F) do not contain antimony, the antimony/halogen flame retardancy mechanism cannot be operating. But stannous chloride is an efficient Friedel-Crafts catalyst and does catalyze intramolecular substitution in the substrate forming a char and inhibiting flame propagation. Since the complete bulk of the polymer can take part in these reactions, this system is more efficient than those systems that rely on an intumescent coating because removal of the char merely presents a new metal-/aromatic char-forming surface to the flame.

ILLUSTRATION II

Copolymer II was prepared by polymerizing a mixture of styrene (90g.) and p-vinylbenzenesulphonic acid (10g.) in polymerization tubes in a manner similar to Illustration I by heating the monomers at 120° C for 16 hours then to 200° C for 3 hours. When the ground polymer was blended with 10% by weight antimony oxide and 10% by weight Declorane plus and bars compression molded and tested in UL-94 configuration, the blend did not burn but formed a char, inhibiting further flame propagation. The blend lost only 3.2% of its weight during testing.

A blend of polystyrene with 10% by weight antimony oxide and 10% by weight Declorane Plus burned and dripped; demonstrating that the mechanism of fire retardancy is through char formation involving a reactive pendant group, in this case —$SO_3H$, that undergoes a catalyzed substitution reaction. The cross-linked aromatic structure and the metal salt catalyzing the reaction form a protective char.

ILLUSTRATION III

A rubber-modified styrene polymer (Copolymer III) was prepared by polymerizing 1640g. (82%) of styrene and 200g. (10%) of vinylbenzylchloride in the presence of 160g. (8%) of Firestone Diene 55 polybutadiene. This material had an Izod impact strength of 0.93 ft-lbs/inch of notch, a heat distortion temperature of 174° F, a melt flow rate of 0.34g./10 minutes, a yield tensile strength of 4200 psi, an ultimate tensile strength of 4100 psi, an elongation of 2%, a number average molecular weight of 53,000 and a weight average molecular weight of 336,000. Ten-gram samples of this polymer were dry blended with one gram of various metal salts and a 5 × ½ × ⅛ inch bar was molded from each blend.

The following salts were used: stannous chloride, zinc oxide, antimony oxide, aluminum phosphate, ferric oxide, ferrous sulphate, heptahydrate, ferric chloride, zinc borate, cuprous chloride, cupric oxide, barium carbonate, silver oxide, boric acid, aluminum stearate, sodium pyrophosphate, sodium salt of dibutylphosphate. The copper salts and aluminum stearate showed no sign of char formation while all others showed some tendency of char formation. The lower level of vinylbenzylchloride in Copolymer III when compared to Copolymer I and the increased difficulty in grinding an impact resistant polymer to fine particles meant that the inefficient dry blend technique used in these screening experiments resulted in higher burn levels than found in Table I. However, within the series some interesting comparisons can be made and are given in Table II. All runs contain Copolymer III.

Table II

| Run | Additive | Burning Test | % Wt. Loss During Testing |
|---|---|---|---|
| A | 9% $Sb_2O_3$ | Burns, forms char | 33.0 |
| B | 9% $Sb_2O_3$ 9% Chlorowax 70 | Char formed | 6.1 |
| C | 9% $FeCl_3$ | No burning | 6.0 |
| D | 9% $FeSO_4 7H_2O$ | Burned slowly forming char | 85.0 |
| E | 9% $FeSO_4 7H_2O$ | As above | 83.0 |

Table II-continued

| Run | Additive | Burning Test | % Wt. Loss During Testing |
|---|---|---|---|
| F | 9% Chlorowax 70 9% $Fe_2O_3$ | As above | 26.0 |
| G | 9% $Fe_2O_3$ 9% Chlorowax 70 | As above | 71.0 |

The efficiency with which ferric chloride initiates the char forming reaction that inhibits flame propagation can be attributed to its efficiency as a Friedel-Crafts catalyst. Antimony oxide is a less efficient catalyst, and it requires a longer exposure to the flame to build up a protective char. However, in the presence of additional chlorine the formation of antimony trihalide in the substrate is faster and, since $SbCl_3$ is a more efficient Friedel-Crafts catalyst, char formation is faster. As has been shown earlier, the antimony/halogen flame inhibition reaction is not the mechanism of fire retardance since the levels at which antimony and halogen are present are lower than required for operation of this mechanism.

When halogen is added to the more stable iron salts, the salt/halogen reaction to form a metal halide does not take place under the temperatures generated during testing, and so an efficient catalyst is not formed and char formation remains slow. A further point shown in Table II is that the copolymer does burn and that the low level of chloromethyl substitution does not give any degree of fire retardance to the polymer. Furthermore the mere presence of 10% by weight of a metal salt does not result in a protective char being formed. Two things are required, a reactive pendant group and a Friedel-Crafts catalyst. The combination of a cross-linked network and an entrapped metal salt yields the protective char.

ILLUSTRATION IV

A 85:15 weight percent styrene vinylbenzylchloride copolymer (Copolymer IV) was prepared by polymerizing 1700g. of styrene and 300g. of vinylbenzylchloride in a half gallon Chemco reactor for 2.5 hours at 128° C followed by 2.5 hours at 145° C and 2.5 hours at 170° C.

Samples were taken from the reactor after 2.5 hours (Copolymer V) and after 5 hours (Copolymer VI). The bulk of the material undergoing the full 7.5 hour cycle. The residual monomers present were removed from Copolymer IV by passing the material through a devolatilizing extruder. Copolymers V and VI were vacuum dried prior to analyzing for percent chlorine which proved to be 4.6 and 4.5%, respectively. This indicates that Copolymer V contained 19.8% vinylbenzylchloride and that Copolymer VI contained 17.6% vinylbenzylchloride. Since the level of vinylbenzylchloride added to the feedstock was 15%, the vinylbenzylchloride was being incorporated into the copolymer at a faster rate than styrene, but the rates of reactions are not so different that the inhomogeneity in composition is discernible by incompatibility in the final product. Ten-gram samples of the copolymers prepared in the above experiment were blended with various metal salts and the results are summarized in Table III.

Table III

| Run | Polymer | Additives | Burning Test | % Loss |
|---|---|---|---|---|
| A | Copolymer V (8.5g.) | $Sb_2O_3$ (1g.) Dechlorane 515 (1.5g.) | Formed a char | 3.3 |
| B | Copolymer VI | $Sb_2O_3$ (1.5g.) | Formed a char | 25 |

Table III-continued

| Run | Polymer | Additives | Burning Test | % Loss |
|-----|---------|-----------|--------------|--------|
|   | (10g.) | Dechlorane 515 (1.5g.) |  |  |
| C | Copolymer IV (10g.) | None | Burned, did not drip | 80 |
| D | Copolymer IV (10g.) | Sb$_2$O$_3$ (1g.) | Burned, formed a char, then went out | 19.0 |
| E | Copolymer IV (10g.) | Sb$_2$O$_3$ (1g.) Dechlorane 515 (1g.) | As above | 18.0 |
| F | Copolymer IV (10g.) | Zinc borate (1g.) | Formed a char | 3.8 |
| G | Copolymer IV (10g.) | Stannous chloride (1g.) | Formed a char | 16.8 |
| H | Copolymer IV (10g.) | Boric anhydride (1g.) | Burned, formed a char, low flame propagation | 19.5 |
| I | Copolymer IV (10g.) | Zinc acetate (1g.) | Burned slowly, formed char | 28.0 |
| J | Copolymer IV (10g.) | Manganese dioxide (1g.) | Burned, formed a char | 15.3 |
| K | Copolymer IV (10g.) | Cobalt chloride (1g.) | Did not burn | 7.2 |
| L | Copolymer IV (10g.) | Cobalt oxide (1g.) | Burned, formed a char | 18.6 |
| M | Copolymer IV (10g.) | Cobalt hexamine chloride (1g.) | As above | 24.0 |
| N | Copolymer IV (10g.) | Titanium dioxide (1g.) | Formed char of low integrity | 53.0 |
| O | Copolymer IV (10g.) | Calcium sulphate (1g.) | Burned | 77.0 |
| P | Copolymer IV (10g.) | Calcium oxide (1g.) | Poor integrity of char | 63.0 |
| Q | Copolymer IV (10g.) | Calcium hexafluoroscilicate (1g.) | Burned, formed a char | 63.6 |
| R | Copolymer IV (10g.) | Cobalt hexafluoroscilicate (1g.) | As above | 64.0 |
| S | Copolymer IV (10g.) | Chromium bromide (1g.) | Burned, formed a char | 15.7 |
| T | Copolymer IV (10g.) | Ferrous chloride (1g.) | Formed a char | 8.6 |
| U | Copolymer IV (10g.) | Cerric titanate (1g.) | As above | 25.5 |
| V | Copolymer IV (10g.) | Manganese chloride (1g.) | As above | 19.4 |
| W | Copolymer IV (10g.) | Cupric chloride (1g.) | As above | 12.4 |
| X | Copolymer IV (10g.) | Calcium chloride (1g.) | As above | 25.6 |
| Y | Copolymer IV (10g.) | Phenylarsine oxide (1g.) | As above | 31.8 |
| Z | Copolymer IV (10g.) | Tantalum oxide (1g.) | As above | 39.5 |
| AA | Copolymer IV (10g.) | Sodium pyrophosphate (1g.) | Burned | 84.0 |
| BB | Copolymer IV (10g.) | Vanadium pentoxide (1g.) | Burned | 87.5 |
| CC | Copolymer IV (10g.) | Nickel(ous) chloride (1.g.) | Burned | 78.5 |

It is apparent from the above screening tests that there are many metal salts that react with Copolymer IV to yield a flame inhibiting char as efficiently as does Sb$_2$O$_3$; e.g., runs F, G, H, L, S, T, and W.

It is obvious that the mechanism of flame retardancy is something other than halogen/antimony since other metal salts are operative. It is equally obvious that the mechanism is char-formation involving Friedel-Crafts substitution reactions.

Sice poly-p-vinylbenzylchloride can undergo an intramolecular Friedel-Crafts reaction in the ortho position of the aromatic ring to form a cross-linked structure, some experiments were run in which polyvinylbenzylchloride was used as an additive in polymer systems that do not themselves contain aromatic nuclei.

ILLUSTRATION V

Run

A. Polystyrene (10g.) was dry blended with polyvinylbenzylchloride (1.5g.), antimony oxide (1g.) and Chlorowax 70 (1g.) and the blend compression molded into two ⅛ × ¼ × 5 inch bars. Each bar was tested in vertical position and the polymer formed a char losing an average 7.2% by weight during two burns. When a similar test is made without the addition of the polyvinylbenzylchloride, Table I, Run 3), the material burned and dripped.

B. A blend of polypropylene powder 6014 (10g.) and polyvinylbenzylchloride (1.5g.) with antimony oxide (1.5g.) and Chlorowax 70 (1.5g.) was compression molded into two ⅛ × ¼ × 5 inch bars. The bars were tested in a vertical position and after four burns each had lost only 9% by weight and a good char had formed.

1. A blend of polypropylene (10g.), polyvinylbenzylchloride (1g.) and polystyrene (1g.) with antimony oxide (1.5g.) and Chlorowax 70 (1.5g.) was compression molded into bars. The bars were tested in a vertical position and the polymer burned and dripped.

This would indicate that there is a minimum level at which polyvinylbenzylchloride can effectively form a char.

D. A blend of polypropylene (10g.), polystyrene (1.5g.), antimony oxide (1.5g.) and Chlorowax 70 (2g.)

when formed into bars and tested in a vertical position burned and dripped.

Run

A comparison of the performance of blend B with 1 shows that the mechanism of flame retardancy is due to char formation, since the antimony and halogen levels in each blend are comparable while one fails and one passes the burning tests.

E. Polyethylene (10g.) was blended with polyvinylbenzylchloride (1.5g.), antimony oxide (1.5g.) and Chlorowax 70 (1.5g.). Two bars were compression molded and tested in UL-94 configuration. The polymer initially burned, formed a char and was extinguished. A second ignition was extinguished after 6 seconds.

A comparitor blend made without the addition of polyvinylbenzylchloride burned and dripped.

F. Polyethylene (12g.) was blended with polyvinylbenzylchloride (2g.) antimony oxide (2g.) and Dechlorane 515 (4g.). When bars formed by compression molding this blend burned in a vertical burning test, the polymer did not burn and lost only 3.9% of its weight while forming a char.

G. A blend of polyethylene (12g.), antimony oxide (2g.) and Dechlorane 515 (5.5g.) was prepared and compression molded. The polymer burned for 12 seconds after the first ignition but dripped after the second.

A comparison between runs E, F, and G shows the utility of polyvinylbenzylchloride as an additive that promotes a char, eliminating drip, making the blend a useful material. The mechanism of fire retardancy once again being demonstrated as resulting from some mode of action other than Sb/halogen flame inhibition.

While a single Friedel-Crafts reaction between a pendant reactive group and an adjacent chain forms a cross-link in the examples given above, it is conceivable to carry out a similar cross-linking reaction with a bifunctional molecule. A series of screening experiments were made with various bifunctional organic compounds using the antimony oxide/organic halide as an in situ Friedel-Crafts catalyst.

ILLUSTRATION VI

Run

1. α,α-Dichloro-p-xylene (1.5g.) was blended with polystyrene (10g.) and antimony oxide (1g.) and the blend molded into two ⅛ × ½ × 5 inch bars. When subjected to a small flame, the polymer burned and dripped.

2. A blend consisting of α,α-dichloro-p-xylene (1.5g.), antimony oxide (1g.) and Chlorowax 70 (1g.) with polystyrene (10g.) when molded and tested in a vertical burning test also burned and dripped.

A comparison of this result with the result described in Illustration IV, run A, the greater efficiency afforded by requiring only one insertion reaction to form a cross-link is amply demonstrated. Additionally, the fact that both Illustration V, blend A; and Illustration VI, blend 1, contain the same amount of halogen in the same form, together with the fact that one passes while one fails, again demonstrates that the halogen/antimony mechanism is not the mechanism of fire retardancy. A new method is present, that method being the formation of a char through Friedel-Crafts cross-linking reactions.

The results of the other additives screened in this illustration are reported in Table IV. Polystyrene (10g.) and Sb$_2$O$_3$ (1g.) were used in all blends.

Table IV

| Run | Additives | Behavior During Testing |
|---|---|---|
| 1 | p-Dibromobenzene (1.5g.) | Burned, dripped |
| 2 | p-Dibromobenzene (1.5g.) Chlorowax 70 (1g.) | Burned, dripped |
| 3 | 9,10-Dibromoanthracene (1.5g.) | Did not burn, but dripped |
| 4 | 9,10-Dibromoanthracene (1.5g.) Chlorowax 70 (1g.) | Burned and dripped |
| 5 | p,p'-Diphenylmethane diisocyanate (1.5g.) | Melted and dripped |
| 6 | p,p'-Diphenylmethane diisocyanate (1.5g.) Chlorowax 70 (1g.) | Melted and dripped |
| 7 | Tetrachloroterephthaloyl chloride (1.5g.) | Burned and dripped |
| 8 | Tetrabromophthalic anhydride (1.5g.) | Burned and dripped |
| 9 | Terephthaloyldicarboxaldehyde (1.5g.) | Burned and dripped |
| 10 | Terephthaloyldicarboxaldehyde (1.5g.) Chlorowax 70 (1g.) | Burned and dripped |
| 11 | EDTA disodium salt (1.5g.) | Burned very fast |
| 12 | EDTA disodium salt (1.5g.) Chlorowax 70 (1g.) | Burned and dripped |
| 13 | Dichloromethylsilane (1.2g.) | Did not burn, but dripped |
| 14 | 9,10-Dichloromethylanthracene (1g.) | Melted, burned and dripped |
| 15 | Dichloromethylmesitylene (1g.) | As above |

These examples show that polyvinylbenzylchloride as an additive is efficient in forming a fire retardant char. As many of the runs in Table IV have halogen levels comparable to VBC runs yet fail to give fire retardancy when blended with polystyrene, one can conclude that the halogen content within the polymer in a blend is not of a sufficiently high level to interact with antimony to form a fire retardant polymer through the halogen/antimony route.

ILLUSTRATION VII

In a similar manner to that described in Illustration I, Copolymer VII consisting of styrene (90g.) and vinylbenzoic acid (10g.) was prepared. The low solubility of the acid in styrene resulted in an inhomogeneous product being formed. However, the polymer was ground and blended with Sb$_2$O$_3$ (10%) and Declorane plus (10%). The material, when compression molded into bars and tested in UL-94 configuration, failed due to dripping. An ester of vinylbenzoic acid would be expected to be more soluble than the free acid.

It is apparent from the above examples that using the teachings of my invention a thermoplastic resin composition can be produced which, when subjected to a flame, forms a char that inhibits flame propagation while having a relatively low halogen content.

I claim:

1. A flame retardant thermoplastic composition comprising:
   (a) a thermoplastic resin comprising an effective amount of at least one substituted vinyl aromatic monomer and at least one monomer selected from the group consisting of ethylene, propylene, and styrene, wherein said substituted vinyl aromatic monomer has the structure:

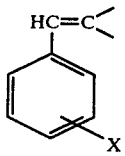

where X is —$CH_2Cl$, —$CH_2Br$, —$CH_2OH$, —$SO_3H$,

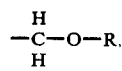

—CHO, —$CO_2R$, —$CH(CH_3)_2$ or —$C(O)CH_3$ and R is an alkyl group containing 1 to 6 carbon atoms; and
   (b) an effective amount of a Lewis acid or Lewis acid precursor, which forms a char that inhibits flame propagation.

2. The composition of claim 1 wherein the substituted vinyl aromatic monomer is vinylbenzylchloride.

3. The composition of claim 1 wherein the substituted vinyl aromatic monomer is vinylbenzene sulphonic acid.

4. The composition of claim 2 wherein about 5 to 20 wt.% vinylbenzylchloride is copolymerized in the thermoplastic resin.

5. The composition of claim 1 wherein the Lewis acid or Lewis acid precursor is antimony oxide, stannous chloride, ferric chloride, zinc borate, or an antimony oxide-chlorinated paraffin mixture.

6. The composition of claim 4 wherein styrene is copolymerized in the thermoplastic resin.

7. The composition of claim 6 which contains about 2 to 20 wt.% of antimony oxide.

8. A flame retardant thermoplastic composition comprising:
   (a) a polymer blend comprising a thermoplastic resin selected from the group consisting of ethylene, propylene and styrene polymers, and an effective amount of a polymer of a substituted vinyl aromatic monomer, wherein said substituted vinyl aromatic monomer has the structure:

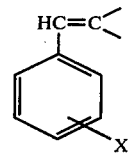

where X is —$CH_2Cl$, —$CH_2Br$, —$CH_2OH$, —$SO_3H$,

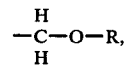

—CHO, —$CO_2R$, —$CH(CH_3)_2$ or —$C(O)CH_3$ and R is an alkyl group having 1 to 6 carbon atoms; and
   (b) an effective amoung of Lewis acid or Lewis acid precursor, which forms a char that inhibits flame propagation.

9. The composition of claim 8 wherein the thermoplastic resin is styrene polymer.

10. The composition of claim 8 wherein the substituted vinyl aromatic monomer is vinylbenzylchloride.

11. The composition of claim 8 wherein the substituted vinyl aromatic monomer is vinylbenzene sulphonic acid.

12. The composition of claim 8 wherein the Lewis acid or Lewis acid precursor is antimony oxide, stannous chloride, ferric chloride, zinc borate, or an antimony oxide chlorinated paraffin mixture.

13. The composition of claim 9 wherein the styrene polymer is a rubber-modified styrene polymer.

14. The composition of claim 9 which contains about 2 to 20 wt.% of antimony oxide.

* * * * *